United States Patent [19]

Lehtinen et al.

[11] Patent Number: 5,180,916
[45] Date of Patent: Jan. 19, 1993

[54] APPARATUS FOR DETECTING IONIZING RADIATION

[75] Inventors: Kauko Lehtinen, Raisio; Timo Oikari; Tapio Yrjönen, both of Turku, all of Finland

[73] Assignee: Wallac Oy, Turku, Finland

[21] Appl. No.: 756,694

[22] Filed: Sep. 9, 1991

[51] Int. Cl.$^5$ .............................................. G01T 1/204
[52] U.S. Cl. ...................................... 250/367; 250/369
[58] Field of Search ............... 290/367, 366, 369, 362, 290/346

[56] References Cited

U.S. PATENT DOCUMENTS

| | | | |
|---|---|---|---|
| 3,898,463 | 8/1975 | Noakes | 250/367 |
| 4,833,326 | 5/1989 | Valenta et al. | 250/367 |
| 4,931,649 | 6/1990 | Czirr et al. | 250/367 |

Primary Examiner—Janice A. Howell
Assistant Examiner—Richard Hanig
Attorney, Agent, or Firm—Armstrong & Kubovcik

[57] ABSTRACT

The present invention provides a scintillation counter that includes a measuring chamber accommodated to take the sample and viewed by two photodetectors, preferably photomultipliers, that can be operated in coincidence. Associated with the chamber is an additional scintillator, preferably an inorganic crystal scintillator, optically isolated from the chamber by a light-permeable wall and mounted so that the scintillation light generated in the additional scintillator is guided predominantly only to one of the two photodetectors. A comparator is used for registering pulse amplitude disparity between the photodetectors to distinguish low-disparity, sample generated pulses and high-disparity, additional scintillator generated pulses.

11 Claims, 2 Drawing Sheets

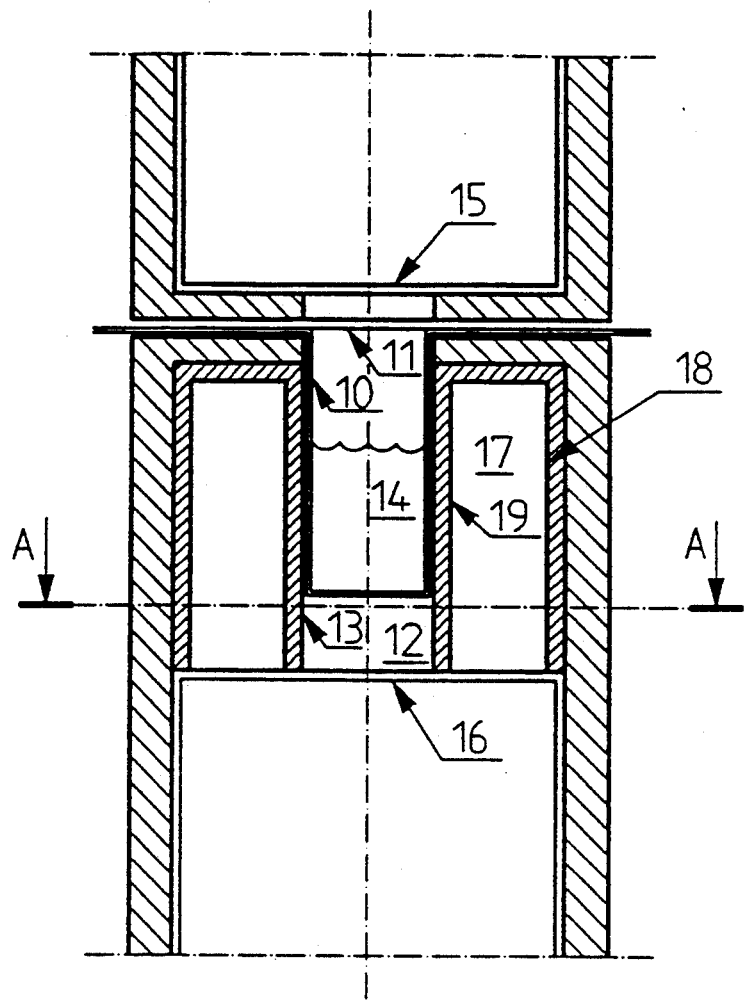
FIG.1.
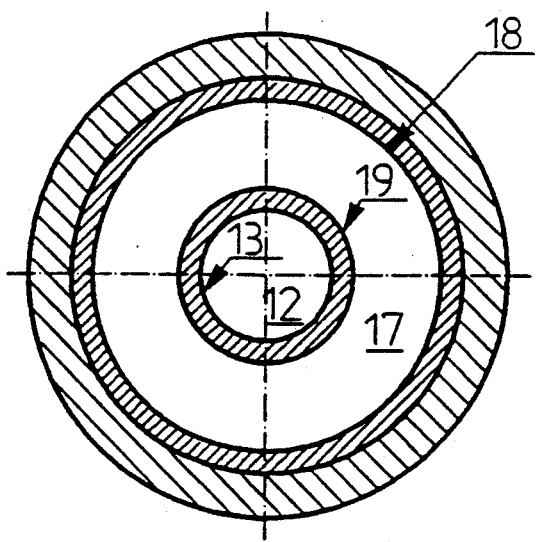
FIG.2.A-A

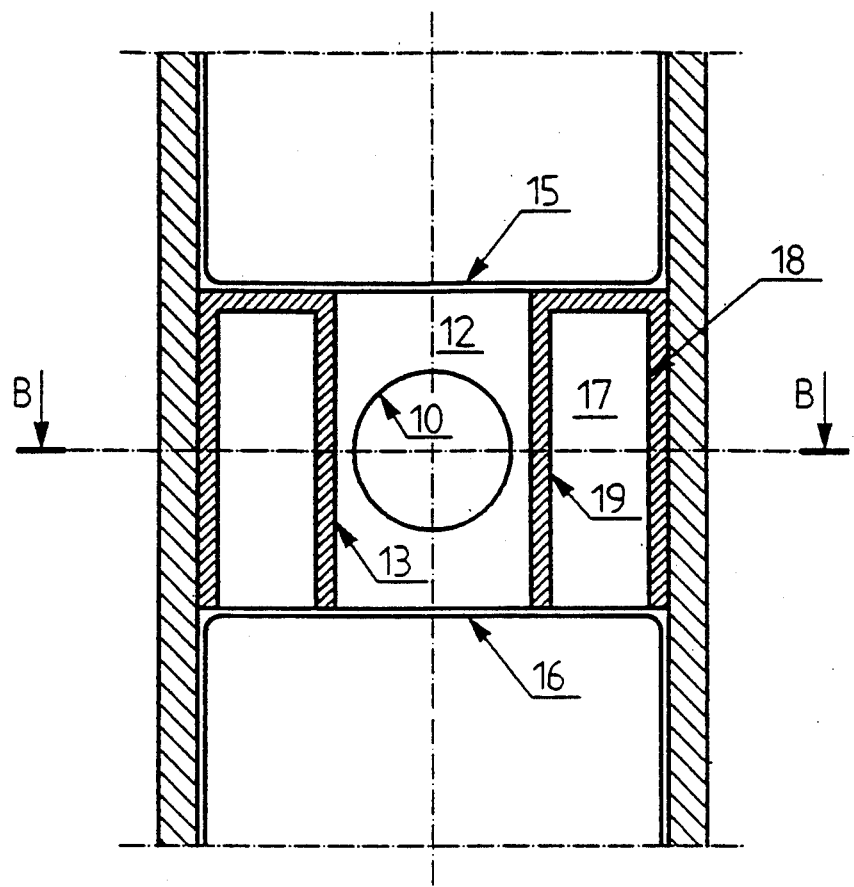
FIG. 3
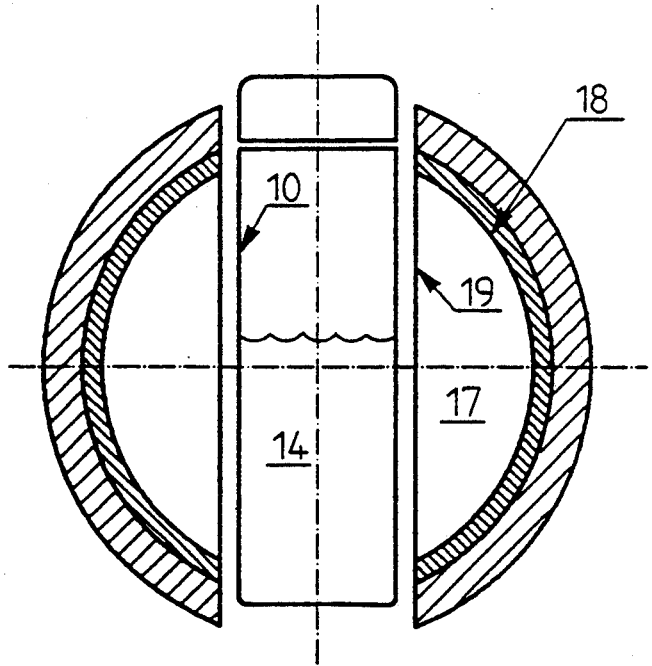
FIG. 4 B-B

APPARATUS FOR DETECTING IONIZING RADIATION

BACKGROUND OF THE INVENTION

The object of the present invention is a scintillation counter and, more particularly, a liquid scintillation counter that can efficiently detect both beta and gamma radiation.

Liquid scintillation counters are commonly used for counting samples that contain low energy beta particle emitting radioisotopes, especially tritium (H-3) and carbon-14 (C-14), which are widely employed radiolabels in biosciences. The ranges of low energy beta particles within the sample are generally at most some tens of micrometers. Consequently, the specimen to be analyzed is dissolved into appropriate an liquid scintillator so that the isotopes come into intimate contact with the molecules of the liquid scintillator and the emitted beta particles can interact with the scintillator substance. In these interaction processes part of the energy of each beta particle is transformed into a rapid light pulse comprising several photons and called a scintillation.

Typically, liquid scintillators comprise an aromatic solvent into which a small amount of fluorescing compounds called fluors are dissolved. The beta particle excites solvent molecules whereafter excited states migrate to fluors. Their subsequent de-excitation produces a scintillation.

The scintillations are detected with suitable photodetectors, preferably photomultiplier tubes (or shortly photomultipliers), which convert the scintillations into electrical pulses. Most often, two photomultipliers are employed that operate in coincidence whereby the scintillation pulse is accepted only if the two photomultipliers detect a pulse simultaneously. The purpose of coincidence operation is elimination of thermal background noise inherent in the photomultipliers.

Because of their low electronic densities liquid scintillators are relatively poor in detecting gamma radiation. Accordingly, there is a need to widen the applicability of liquid scintillation counters towards more efficient gamma detection. Two approaches for this are given in U.S. Pat. Nos. 3,898,463 and 3,944,832 that employ a gamma sensitive inorganic crystal scintillator having a hole or well with transparent walls to take the sample. The crystal is optically coupled to photomultiplier(s) and pulse shape analysis is used to distinguish between fast sample-originated pulses and slower crystal-originated pulses. An additional benefit is that the above detectors can detect, and thus eliminate, penetrating external background radiation to make low-activity beta counting possible.

Some limitations are associated with the above mentioned detectors, however. To reach the photomultipliers, scintillation photons from a sample have to traverse through the crystal that produces some attenuation and worsens the sensitivity. Furthermore, the required pulse shape analysis is rather complicated electronically and is limited to cases where the sample scintillations are essentially faster than crystal scintillations. Some modern liquid scintillators produce relatively slow pulses thus making pulse shape differentiation between sample and crystal less efficient. The present invention overcomes these drawbacks.

SUMMARY OF THE INVENTION

The present invention provides a scintillation counter that can be used both in betagamma counting and low level beta counting.

The counter comprises a measuring chamber accommodated to take the sample and viewed by two photodetectors, preferably photomultipliers, that can be operated in coincidence. Associated with the chamber is an additional scintillator, preferably an inorganic crystal scintillator, optically isolated from said chamber by a light-impermeable wall and mounted so that the scintillation light generated in said additional scintillator is guided predominantly only to one of said two photodetectors. Comparator means is used for registering pulse amplitude disparity between said photodetectors to distinguish low-disparity, sample generated pulses and high-disparity, additional scintillator generated pulses.

BRIEF DESCRIPTION OF THE DRAWINGS

The present invention will be described in more detail below with reference to the attached drawings wherein FIG. 1 is a vertical sectional view of the first embodiment of the invention.

FIG. 2 is a cross sectional view taken along the line A—A in FIG. 1.

FIG. 3 is a top sectional view of the second embodiment of the invention.

FIG. 4 is a cross sectional view taken along the line B—B in FIG. 3.

DESCRIPTION OF THE PREFERRED EMBODIMENTS

Referring to FIG. 1 and FIG. 2, there is shown the first embodiment of the invention. A sample container 10 produced from a transparent material such as clear or opaque glass or plastic deposited in a counting chamber 12, which is a vertically positioned cylinder. Said sample container 10 is closed by a transparent lid 11 or sealed by a transparent adhesive tape 11 or by a heat-sealable transparent plastic foil 11. The inner surface 13 of said counting chamber is produced from material, which reflects or scatters the light emitted from the sample 14 consisting of a specimen to be analyzed dissolved into an appropriate liquid scintillator as well as possible in order to guide the scintillation photons emitted from said sample 14 as efficiently as possible to the photocathodes of the lower and upper photomultiplier tubes 15 and 16.

Said counting chamber 12 is surrounded by a cylinder shaped additional scintillator 17, which is assembled in a case 18, which prevents beta or corresponding particles emitted by said sample 14 from interacting with said scintillator 17 and which in addition isolates said scintillator 17 optically from said counting chamber 12 and other surroundings of it except said photocathode of the lower photomultiplier tube 16. The inner surface 19 of said case 18 is produced from material which reflects or scatters the light emitted from the scintillator 17 as well as possible in order to guide the scintillation photons emitted from said scintillator 17 as efficiently as possible to the photocathode of said lower photomultiplier tube 16.

Referring to FIG. 3 and FIG. 4, there is shown an alternative construction, in which a sample container 10 typically used in liquid scintillation counters is deposited in a counting chamber 12. The inner surface 13 of the counting chamber 12 is produced from material which reflects or scatters the light emitted from the sample 14 as well as possible in order to guide the scintillation photons emitted from said liquid scintillation sample 14 as efficiently as possible to the photocathodes of the photomultiplier tubes 15 and 16 located on the opposite sides of said counting chamber 12.

Said counting chamber 12 is surrounded by an additional scintillator 17, which is assembled in a case 18, which prevents beta or corresponding particles emitted by the sample 14 from interacting with said scintillator 17 and in addition isolates said scintillator 17 optically from said counting chamber 12 and other surroundings except said photocathode of the photomultiplier tube 16. The inner surface 19 of said case 18 is produced from material which reflects or scatters the light emitted from said scintillator 17 as well as possible in order to guide the scintillation photons emitted from said scintillator 17 as efficiently as possible to the photocathode of said photomultiplier tube 16.

Beta or corresponding particles emitted by said specimen to be analyzed, which is dissolved in said sample container 10 with said liquid scintillator produces scintillation photons in an interaction process with said liquid scintillator, which scintillation photons are detected under optically symmetric conditions by both photomultiplier tubes 15, 16. As a consequence of the symmetry, a substantially equal pulse amplitudes are produced by said photomultiplier tubes.

If said specimen to be analyzed contains a gamma radiation emitting isotope, emitted gamma quantums penetrate the wall of said case 18 and produces a higher amount of scintillation photons in said additional scintillator 17 than in the liquid scintillant, where the specimen is dissolved. This improved production of scintillation photons makes said scintillation detector according to the invention suitable for detecting samples, which contain gamma radiation emitting isotopes.

External penetrating background radiation interacts both with said additional scintillator 17 and said liquid scintillation scintillator producing a higher amount of photons in said additional scintillator. As a consequence of this a higher pulse amplitude is produced by photomultiplier 16, which is optically coupled to said scintillator 17. Comparator means is used for registering pulse amplitude disparity between said photomultiplier tubes 15, 16 to subtract high-disparity, external background generated pulses from low-disparity pulses, generated by beta emitting isotope containing sample 14. This makes said scintillation detector suitable for low activity beta samples.

Said additional scintillator 17 produces a higher amount of scintillation photons in the interaction process with the gamma quantum, because said scintillator is made of inorganic material such as thallium-activated sodium iodide, which electronic density is much higher than the electronic density of any liquid scintillators.

The method according to the present invention is not confined to the above description alone, but it may show even considerable variation within the scope of patent claims.

We claim:

1. A scintillation detector assembly having a measuring chamber accommodated to take the sample to be investigated, and two photodetectors for viewing said sample and being able to operate in coincidence in response to pulses produced by the sample in the measuring chamber, said detector assembly further comprising:
   a case containing an additional scintillator, said case being adjacent said chamber and including a light-impermeable wall for optically isolating said additional scintillator from said chamber, said case optically isolating said additional scintillator from a predetermined one of said two photodetectors and being optically coupled to the other one of said two photodetectors so that the light generated in said additional scintillator is guided predominantly to one of said two photodetectors, and
   comparator means for registering pulse amplitude disparity between said photodetectors to distinguish low-disparity, sample generated coincidence pulses and high-disparity, additional scintillator generated coincidence pulses.

2. A scintillation detector of claim 1 wherein said additional scintillator is of an inorganic material.

3. A scintillation detector of claim 2 wherein said inorganic material is thallium-activated sodium iodide.

4. A scintillation detector apparatus, comprising:
   a measuring chamber for receiving a sample;
   two separated photodetectors optically coupled to said sample and being operable to determine coincidence of pulses produced by the sample in said measuring chamber;
   a case containing an additional scintillator, said case being adjacent said measuring chamber and including a light-impermeable wall for optically isolating said additional scintillator from said chamber, said case optically isolating said additional scintillator from a predetermined one of said two photodetectors, said additional scintillator being optically coupled to the other one of said two photodetectors so that the light generated in said additional scintillator is guided predominantly to one of said two photodetectors, and
   comparator means for registering pulse amplitude disparity between said photodetectors to distinguish low-disparity, sample generated coincidence pulses and high-disparity, additional scintillator generated coincidence pulses.

5. A scintillation detector of claim 4 wherein said additional scintillator is of an inorganic material.

6. A scintillation detector of claim 4 wherein said inorganic material is thallium-activated sodium iodide.

7. A scintillation detector of claim 4 wherein said case is annularly arranged around said measuring chamber.

8. A scintillation detector of claim 4 wherein said case has inner and outer sidewalls, an opaque top wall, and an optically transparent bottom wall exposed to said other one of said two photodetectors.

9. A scintillation detector of claim 4, wherein said case is annularly arranged around said measuring chamber; said case has inner and outer sidewalls, an opaque top wall, and an optically transparent bottom wall exposed to said other one of said two photodetectors; and said measuring chamber has a cylindrical configuration.

10. A scintillation detector of claim 9, wherein a longitudinal axis of the cylindrical configuration of said measuring chamber is annularly surrounded by said case.

11. A scintillation detector of claim 9, wherein a longitudinal axis of the cylindrical configuration of said measuring chamber is transverse to an annular longitudinal axis of said case.

* * * * *